United States Patent Office 3,180,827
Patented Apr. 27, 1965

3,180,827
THICKENED COMPOSITIONS CONTAINING A HYDRATE OF AN ALUM
Thomas W. Martinek, Crystal Lake, and Donald L. Klass, Barrington, Ill., assignors to The Pure Oil Company, Chicago, Ill., a corporation of Ohio
No Drawing. Filed Apr. 19, 1961, Ser. No. 103,984
10 Claims. (Cl. 252—25)

This invention relates to thickened compositions containing alums as thickening agents, and more particularly to compositions containing a thickening amount of a hydrate of an alum.

In the art of ointments, greases, salves, and thickened compositions generally, a wide variety of thickening agents are used comprising soaps, silicates, inorganic compounds, salts of organic acids, aluminum or heavy-metal organic acid salts, rubber, solid terpenes, alkaline earth metal salts, and alkali metal salts. Many of these thickening agents are expensive, require critical, limited, or large amounts to be effective, and are mono-functional, that is, serve only as thickening agents without contributing other desirable properties to the compositions. Furthermore, many prior art inorganic thickeners require special care in blending and are sometimes deficient in blend stability.

Alums are used in numerous industrial processes and medicinal preparations. For instance, they are used medicinally as corpse tissue-fillers, astringent lotions, salves and ointments, styptic pencils, and the like compositions for their well-known properties, but not as thickeners for these compositions. Industrial applications include, among others, mordant dying, water purification, paper sizing, and dressing of skins.

In accordance with this invention, we have discovered that alums generally, and highly hydrated alums in particular, are excellent thickening or gelling agents in liquid vehicles, particularly oleaginous vehicles, for the preparation of ointments, salves, greases, jellies, and similar compositions. The high hydrate of alums, and of aluminum ammonium sulfate in particular, has been found to be an excellent thickener and gelling agent for oleaginous preparation. Alums having isomorphous crystalline structures have been found to share this property.

The alums used in accordance with this invention have the formula:

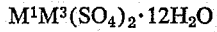

wherein $M^1$ is a monovalent radical, such as ammonia, sodium, potassium, lithium, rubidium, silver, and cesium, and $M^3$ is a trivalent radical, such as aluminum, iron, chromium, antimony, arsenic, bismuth, cobalt, vanadium, gallium, manganese, titanium, and the like. The $SO_4$ anion may be $SeO_4$ (selenate), or $TeO_4$ (tellurate).

Examples of alums that may be used in accordance with this invention are:

Potassium chrome alum ($KCr(SO_4)_2 \cdot 12H_2O$)
Lithium aluminum alum ($LiAl(SO_4)_2 \cdot 12H_2O$)
Sodium aluminum alum ($NaAl(SO_4)_2 \cdot 12H_2O$)
Potassium aluminum alum ($KAl(SO_4)_2 \cdot 12H_2O$)
Rubidium aluminum alum ($RbAl(SO_4)_2 \cdot 12H_2O$)
Cesium aluminum alum ($CsAl(SO_4)_2 \cdot 12H_2O$)
Silver aluminum alum ($AgAl(SO_4)_2 \cdot 12H_2O$)
Thallium aluminum alum ($ThAl(SO_4)_2 \cdot 12H_2O$)
Ammonium alum ($NH_4Al(SO_4)_2 \cdot 12H_2O$)
Ammonium iron alum ($NH_4Fe(SO_4)_2 \cdot 12H_2O$)
Sodium aluminum selenate ($NaAl(SeO_4)_2 \cdot 12H_2O$)
Potassium aluminum selenate ($KAl(SeO_4)_2 \cdot 12H_2O$)
Rubidium aluminum selenate ($RbAl(SeO_4)_2 \cdot 12H_2O$)
Cesium aluminum selenate ($CsAl(SeO_4)_2 \cdot 12H_2O$)
Thallium aluminum selenate ($ThAl(SeO_4)_2 \cdot 12H_2O$)
Ammonium aluminum selenate ($NH_4Al(SeO_4)_2 \cdot 12H_2O$)
Sodium chromium tellurate ($NaCr(TeO_4)_2 \cdot 12H_2O$)
Rubidium chromium tellurate ($RbCr(TeO_4)_2 \cdot 12H_2O$)
Cesium chromium tellurate ($CsCr(TeO_4)_2 \cdot 12H_2O$)
Thallium chrome alum ($ThCr(SO_4)_2 \cdot 12H_2O$)
Ammonium chrome alum ($NH_4Cr(SO_4)_2 \cdot 12H_2O$)
Rubidium manganese alum ($RbMn(SO_4)_2 \cdot 12H_2O$)
Cesium manganese alum ($CsMn(SO_4)_2 \cdot 12H_2O$)
Potassium iron alum ($KFe(SO_4)_2 \cdot 12H_2O$)
Rubidium iron alum ($RbFe(SO_4)_2 \cdot 12H_2O$)
Cesium iron alum ($CsFe(SO_4)_2 \cdot 12H_2O$)
Thallium iron alum ($ThFe(SO_4)_2 \cdot 12H_2O$)
Ammonium iron alum ($NH_4Fe(SO_4)_2 \cdot 12H_2O$)
Potassium cobalt alum $KCo(SO_4)_2 \cdot 12H_2O$)
Rubidium cobalt alum ($RbCo(SO_4)_2 \cdot 12H_2O$)

In order to demonstrate the invention, the following examples are given:

Example I 31 gms. of ammonium alum, $NH_4Al(SO_4)_2 \cdot 12H_2O$ (or $(NH_4)_2SO_4Al_2(SO_4)_3 \cdot 24H_2O$), was dispersed in 10 gms. of a paraffin oil by milling on a three-roll paint mill. The milling produced a dry powder, and additional oil was added in increments until a solids content of about 15% was obtained. At this concentration a non-bleeding, clear, translucent grease was obtained which exhibited no sign of oil separation on standing. This grease was stable up to a temperature of 170° F., at which temperature oil separation began to take place. At higher temperatures, the water of hydration boiled off leaving an oil phase and a solid phase.

Example II 35 gms. of ammonium alum, $NH_4Al(SO_4)_2 \cdot 12H_2D$, is milled with 15 gms. of lard oil by milling as in Example I. Additional lard oil is gradually added until the solids content is about 10% to produce a non-bleeding, white grease which exhibits no separation on standing and is stable up to the dehydration temperature of the alum.

Example III 40 gms. of potassium alum, $KAl(SO_4)_2 \cdot 12H_2O$, is milled with 10 gms. of Mid-Continent Solvent-Refined neutral oil as in Example I. Additional neutral oil is added until the solids content is about 5% to produce a non-bleeding, thixotropic semi-fluid grease which is stable at room temperature.

Example IV 17 gms. of ammonium iron alum,
$$NH_4Fe(SO_4)_2 \cdot 12H_2O$$
is milled with 100 gms. of a highly refined white oil and incremental amounts of white oil added until the solids content is about 10% to produce a semi-solid stable ointment.

The alums used in accordance with this invention are commercially available or may be prepared by crystallizing the particular monovalent metal sulfate, selenate, or tellurate with the particular trivalent metal sulfate, selenate, or tellurate to form the desired alum. Using potassium sulfate and aluminum sulfate to illustsrate, the alum is prepared by heating or evaporating an aqueous solution to precipitation or dryness, whereby the following reaction takes place,

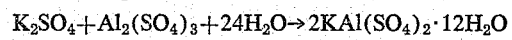

The alums constitute a series of isomorphous compounds wherein unipositive and tripositive radicals are combined with sulfate, selenate or tellurate radicals. The concentration of alum in the oleaginous vehicle may vary from 2 to 50% by weight, and generally about 10% to 30% by weight is used. As little as 15% by weight in a paraffinic hydrocarbon oil gives a grease consistency. Examples of oleaginous vehicles which may be used are mineral lubricating oils, solvent-refined lubricating oils, vegetable oils, animal oils, viscous polyols, fish oils, synthetic ester oils, and the like.

The thickening effect obtained is a function of the concentration of the alum and the state of dispersion. Any type of colloid mill which is capable of grinding the alum to the desired state of subdivision may be used. Suitable mills are roll mills, ball mills, hammer mills, rotor-stator mills, and the like. The alum may be ground prior to dispersion in the vehicle or in the vehicle itself.

Compositions containing materials other than vehicle and alum are contemplated. For instance, a particularly effective antiseptic and astringent after-shave cream is prepared by milling 10 gms. ammonium alum, 2 gms. boric acid, 10 gms. isopropyl alcohol and 77 gms. of light mineral oil until a soft grease is obtained. Perfumes and coloring agents may be added if desired. Other alcohols such as denatured alcohol (e.g., Formula 30 alcohol), butyl alcohol, and aliphatic alcohols generally may be used in the foregoing type of compositions. Other antiseptics than boric acid may be included.

Where an non-oily lotion is desired, 2 parts of alum may be dispersed in about 98 parts of a volatile liquid, such as petroleum ether. Perfumes, alcohols, and other chemicals may replace a part of the volatile liquid to impart desirable properties. The dispersed alum does not settle from the liquid, and further serves to maintain other insoluble dispersed solids in suspension.

In the skin-dressing industry, dispersion of alums in an oleaginous vehicle, incorporating other desirable agents without water present, provides a new and useful composition for the preservation of skins in a supple condition.

The embodiments of the invention in which an exclusive property or privilege is claimed are defined as follows:

1. A stable, thickened composition consisting essentially of the product prepared by milling incremental amounts of an oleaginous liquid with an alum until the alum content of the composition is about 2 to 50% by weight.

2. A stable, thickened composition in accordance with claim 1 in which said alum has the formula $$M^1 M^3 (XO_4)_2 \cdot 12 H_2 O$$

wherein $M^1$ is a monovalent radical of the group consisting of ammonia, sodium, potassium, lithium, rubidium, silver and cesium, $M^3$ is a trivalent radical of the group consisting of aluminum, iron, chromium, antimony, arsenic, bismuth, cobalt, vanadium, gallium, manganese and titanium, and X is a member of the group consisting of sulfur, selenium and tellurium.

3. A stable, thickened composition in accordance with claim 2 in which $M^1$ is ammonium.

4. A stable, thickened composition in accordance with claim 2 in which $M^1$ is an alkali metal.

5. A stable thickened composition in accordance with claim 2 in which $M^3$ is aluminum.

6. A non-bleeding, clear, transluscent grease composition consisting essentially of the product prepared by milling the total amount of an alum in a portion of a mineral lubricating oil to produce a dry powder, and adding incremental amounts of said mineral lubricating oil while continuing the milling of said composition until the alum content is about 10–30% by weight of said composition.

7. A non-bleeding grease composition in accordance with claim 6 in which said alum is ammonium alum.

8. A non-bleeding grease composition in accordance with claim 6 in which said oleaginous vehicle is lard oil and said alum is ammonium alum.

9. A non-bleeding grease composition in accordance with claim 6 in which said oleaginous vehicle is neutral oil and said alum is potassium alum.

10. A non-bleeding grease composition in accordance with claim 6 in which said alum has the formula $$M^1 M^3 (XO_4)_2 \cdot 12 H_2 O$$

wherein $M^1$ is a monovalent radical of the group consisting of ammonia, sodium, potassium, lithium, rubidium, silver and cesium, $M^3$ is a trivalent radical of the group consisting of aluminum, iron, chromium, antimony, arsenic, bismuth, cobalt, vanadium, gallium, manganese and titanium, and X is a member of the group consisting of sulfur, selenium and tellurium.

References Cited in the file of this patent

UNITED STATES PATENTS

| | | |
|---|---|---|
| 85,714 | Wigg | Jan. 5, 1869 |
| 139,315 | Hucks | May 27, 1873 |
| 2,836,560 | Teale | May 27, 1958 |

OTHER REFERENCES

Keithler: The Formulation of Cosmetics and Cos. Specialties, Drug and Cos. Ind., 1956, pp. 327, 467, and 468.

Sagarin: Cosmetics Sci. and Tech. Interscience Pub., N.Y., 1957, pp. 720, 723.